United States Patent [19]
Martin et al.

[11] Patent Number: 5,251,916
[45] Date of Patent: Oct. 12, 1993

[54] FLEXIBLE BOOT FOR UNIVERSAL JOINT

[75] Inventors: Dieter Martin, Lakewood; Philip M. Patterson, Littleton; Douglas J. Swanson, Castlerock, all of Colo.

[73] Assignee: The Gates Rubber Company, Denver, Colo.

[21] Appl. No.: 863,617

[22] Filed: Apr. 6, 1992

[51] Int. Cl.$^5$ .............................................. F16J 15/32
[52] U.S. Cl. ............................ 277/212 FB; 277/212 R
[58] Field of Search ............ 277/212 R, 212 C, 212 F, 277/212 FB

[56] References Cited

U.S. PATENT DOCUMENTS

| | | | |
|---|---|---|---|
| 3,511,061 | 5/1970 | Burckhardt | 277/212 FB |
| 3,830,083 | 8/1974 | Hadick et al. | 277/212 FB |
| 3,995,502 | 12/1976 | Jones | 277/232 FB |
| 4,456,269 | 6/1984 | Krude et al. | 277/212 FB |
| 4,527,672 | 7/1985 | Schreiner et al. | 277/212 FB |
| 4,560,178 | 12/1985 | Hempel | 277/212 FB |
| 4,573,693 | 3/1986 | Nakata et al. | 277/233 |
| 4,627,826 | 12/1986 | Juziuk et al. | 464/171 |
| 4,747,805 | 5/1988 | Weischof et al. | 464/175 |
| 4,826,466 | 5/1989 | Triquet | 277/212 FB |
| 4,878,389 | 11/1989 | Boge | 277/212 FB |
| 4,923,432 | 5/1990 | Porter | 464/175 |
| 5,051,105 | 9/1991 | Sugiura et al. | 277/212 FB |

FOREIGN PATENT DOCUMENTS 0815393  3/1981  U.S.S.R. .

Primary Examiner—William A. Cuchlinski, Jr.
Assistant Examiner—Daniel G. DePumpo
Attorney, Agent, or Firm—H. W. Oberg; C. H. Castleman, Jr.; S. G. Austin

[57] ABSTRACT

A flexible boot of the polymeric type for use with a universal joint where the boot has a radially outermost generally tubular wall section that interconnects to the boot body by oppositely facing peaks and valleys. The thickness of the boot sidewall is controlled to effect desire bending where, in one embodiment, peaks and valleys are thicker than an adjoining sidewall of a corrugation.

19 Claims, 2 Drawing Sheets

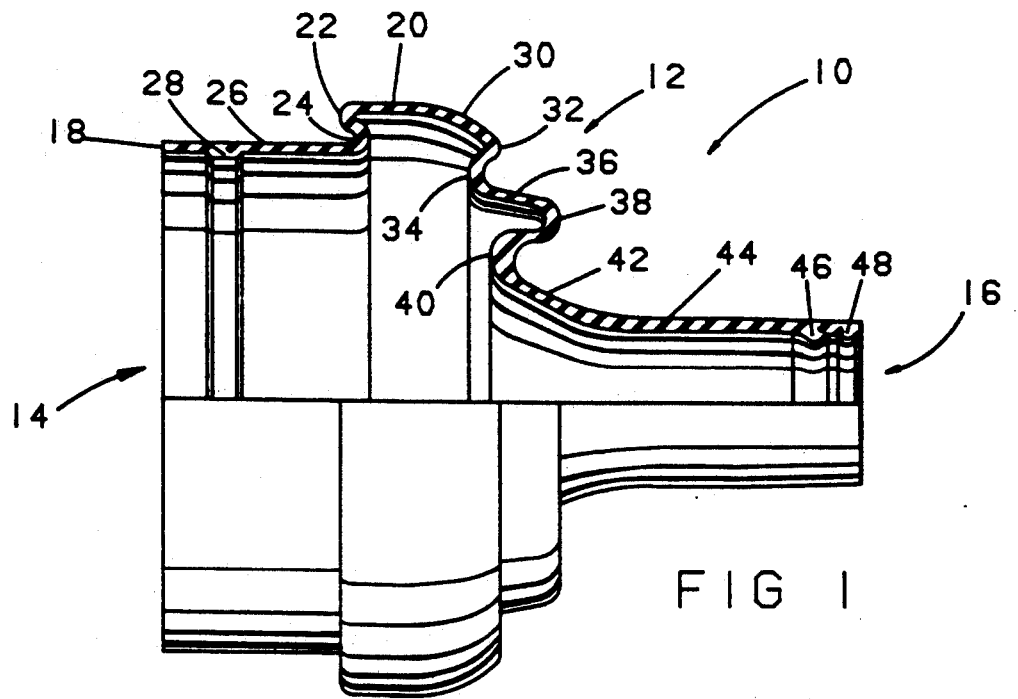
FIG 1
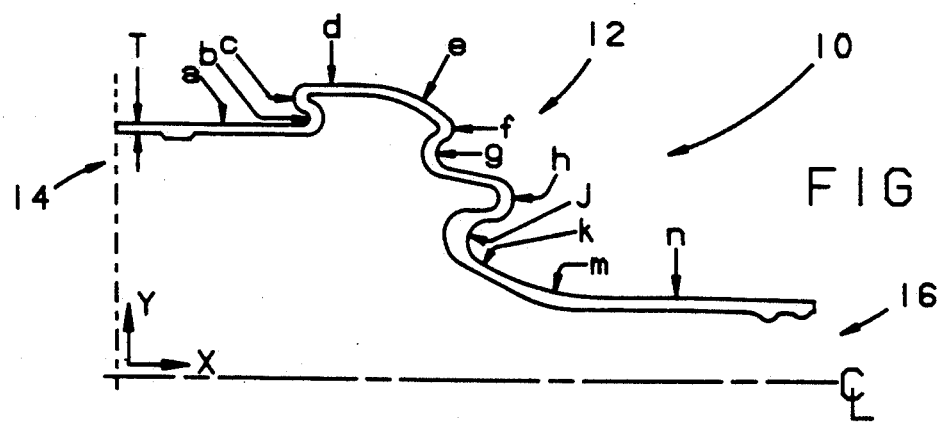
FIG 2
| AREA | X axial distance | Y radial distance | T Thickness |
|---|---|---|---|
| a  sidewall | .895 | 2.107 | .081 |
| b  valley | 1.624 | 2.162 | .121 |
| c  peak | 1.494 | 2.330 | .121 |
| d  shell | 1.814 | 2.448 | .080 |
| e  shell | 2.599 | 2.325 | .096 |
| f  peak | 2.846 | 2.095 | .121 |
| g  valley | 2.707 | 1.884 | .121 |
| h  peak | 3.348 | 1.520 | .121 |
| J  valley | 2.973 | 1.215 | .208 |
| k  sidewall | 3.098 | .968 | .086 |
| m  sidewall | 3.690 | .741 | .128 |
| n  sidewall | 4.712 | .695 | .104 |
FIG 3

FLEXIBLE BOOT FOR UNIVERSAL JOINT

BACKGROUND OF THE INVENTION

The invention relates to joint packings or seals, but more particularly, the invention relates to flexible boots of the corrugated type for use with universal joints.

Flexible boots have long been used to protect the operating environment for universal joints by retaining grease for the joints and by keeping foreign objects away from the joints. The accomplishment of such functions over a suitable flex-life operating-period, while seemingly simple, is, in reality, more complex because damage to the boot must be avoided as much as possible to avoid early failures of the universal joint.

In use, damage to a flexible boot may be inflicted in several different ways such as for example by: a) external abrasion of corrugations caused by them rubbing against themselves as the boot is flexed and rotated with its ends in angular misalignment; b) internal abrasion of corrugations caused by the boot rubbing against part of an encased universal joint as the flexible boot is flexed and rotated with its ends in angular misalignment; and c) external abrasion and puncturing from external sources such as when the flexible boot is operated in a rocky or prodding environment. Additionally, the boot must have a requisite strength to inhibit ballooning when rotated while maintaining requisite flexibility and life over a broad temperature range and angle change.

Flexible boots may be categorized into two general groups based on an orientation of the corrugations in the flexible boot. In a first category, the corrugations are oriented generally radially, with peaks of the corrugations radially outward of valleys of the corrugations. Boot flexing is typically concentrated at the peaks and valleys and is in response to an induced force of an encased joint, the boot of a harder resilient material such as Hytrel as sold by Dupont and disclosed in the 4,747,805 patent, or a combination of two materials such as semirigid polymeric materials such as glass impregnated nylon as disclosed in the 4,627,826 patent. However, such solutions while inhibiting damage from external environmental sources such as by puncturing from rocks, etc. may introduce new problems including flex fatigue.

For example, the flexible boot of the '805 patent has a deflection problem like those boots having radially oriented corrugations in that the wall of the boot is pulled radially inwardly at the large diameter end of the boot and on the side of the boot that is flexed to an acute angle. The inward deflection of the boot sidewall may limit the number of degrees of deflection before the boot is pulled into interference with an encased universal joint.

As explained in the '826 patent, the axially oriented corrugations provide angular movements of up to 30 degrees but thereafter, a spherical member of the joint in conjunction with a socket portion of the boot are required and cooperate with each other to permit further angular movements of the boot. While the design of the '826 boot may permit sufficient angular movements, it requires a dynamic sealing arrangement between the spherical surface of the joint and a spherical socket of the boot. Such an arrangement is not only expensive but it is not 100 percent effective in forming a seal to retain grease. Also, constant sliding between the parts can cause wear leading to seal failure.

The present invention is primarily directed to flexible boots of the second category which have corrugations oriented generally axially in relation to the boot. The invention addresses general boot problems associated with self inflicted damage to corrugations, and damage associated with the boot contacting internal and external objects as the boot is angularly displaced to angles as high as 40 degrees.

SUMMARY OF THE INVENTION

In accordance with the invention, a flexible boot of the polymeric type is provided for use with a universal joint. The boot is of a category that includes a corrugated sidewall with a plurality of generally tubular walls intermediate a large diameter end and small diameter end and wherein, the corrugations are generally axially oriented. The boot includes a radially outermost and generally tubular wall portion adjacent a large diameter end of the boot and is positioned intermediate oppositely facing peaks and valleys of corrugations such that the generally tubular wall portion forms a protective shell having a somewhat of a semi-toroidal shape or appearance. One end of the outermost tubular wall interconnects to the large diameter end while the opposite end of the tubular wall portion interconnects by way of axially oriented peaks and valleys of corrugations to a small diameter end of the boot. The arrangement of the corrugated sidewall is such that the radially outermost generally tubular wall portion bulges radially outwardly on the acute angle side of the boot as the ends thereof are positioned in angular misalignment from each other such as by means of an encased universal joint.

The sidewall thickness of the corrugations is varied to control the manner in which the sidewall flexes as the end portions of the boot are moved in angular misalignment relative to each other. An optional method for controlling deflection during bending is to provide a boot where the peaks and valleys of the corrugations have a greater thickness than interconnecting sidewall portions of the corrugations.

An advantage of the invention is that the boot corrugations do not rub against themselves to inflict self damage as the ends of the boot are angularly misaligned in relation to each other. Also, the radially outermost tubular wall portion of the boot can be made relatively thick and without any thinned sections for hinging, and still bulge away from an encased universal joint at the large diameter end of the boot on the acute angle side of the boot and thereby avoiding or minimizing internal contact.

Another advantage of the boot of the invention is that it may be made with higher tensile modulus materials without the need for thin walled portions to enhance flexibility at highly stressed hinge points of peaks and valleys to avoid contact between adjacent corrugations. The higher modulus materials provide protection against failure from external abrasion and puncturing from external sources.

These and other advantages of the invention will be readily apparent after reviewing the drawings and description thereof wherein:

FIG. 1 is a one-fourth, axial cross-section of a flexible boot of the invention;

FIG. 2 is an axial cross-section of the sidewall of the boot of FIG. 1 with reference arrows to specific sidewall locations;

FIG. 3 is a chart showing boot sidewall thicknesses and axial and radial dimensions at the reference arrow positions for the axial cross-section of FIG. 2.

DESCRIPTION OF PREFERRED EMBODIMENT

Figure 4:
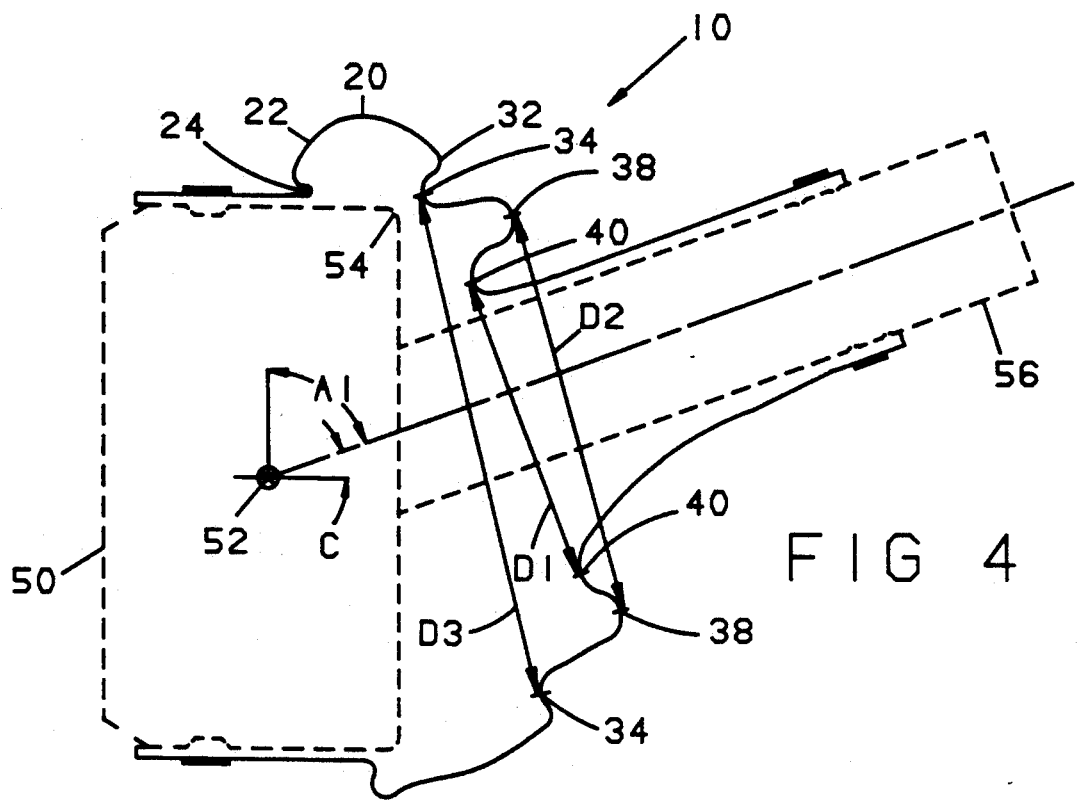
FIG. 4 is a schematic side view showing the outside surface configuration of the boot of FIG. 1 with a universal joint shown in dotted form deflected with the boot to 20 degrees.

Referring to FIGS. 1-3, a flexible boot 10 of the molded, polymeric type is provided for use with a universal joint (not shown). The boot includes a corrugated sidewall 12 with a plurality of generally tubular walls intermediate a large diameter end 14 and a small diameter end 16. The boot has a sidewall 18 that forms a radially outermost and generally tubular wall portion 20 that is interconnected with an external peak 22 and valley 24 of the corrugated sidewall to a tubular wall portion 26 of the adjacent large diameter end. An internal collar 28 may be integrally molded as part of the tubular wall portion 26 and serve as part of a grease seal means for a universal joint.

The radially outermost and generally tubular wall portion 20 may optionally have a convex shape 30 when viewed in axial cross-section, and forms a protective shell. The protective shell interconnects with an oppositely facing external peak 32 and valley 34 of the sidewall so as to give the outermost protective shell somewhat of a semi-toroidal shape. Preferably, but optionally, the first interconnecting valley has a larger diameter than the oppositely facing and coaxially aligned second valley 34. Corrugated sidewall 12 extends to a third generally tubular wall portion 36, a peak 38, a valley 40, an optional conical section 42, and into a fourth generally tubular wall section 44 that extends to the small diameter end 16 where internal collars 46, 48 define part of a grease seal means.

The flexible boot of the invention may be made with any suitable polymeric material which include the natural rubbers, synthetic rubbers, and blends thereof, plastics and urethanes. The boot is particularly adaptable to be made with higher tensile modulus material because such materials usually provide a toughness to inhibit puncturing while providing a satisfactory abrasion resistant quality. Examples of some of the higher modulus materials include the following thermoplastic elastomers: Estane 58206 as sold by The BF Goodrich Company and having a tensile modulus of 270 psi at 30 percent elongation; Pebax 3533 as sold by Elf Atochem and having a tensile modulus of 535 psi at 30 percent elongation; Estane 58887 as sold by The BF Goodrich Company and having a tensile modulus of 660 psi at 30 percent elongation; Estane 58134 as sold by The BF Goodrich Company and having a tensile modulus of 710 psi at 30 percent elongation; Pellethane blend (2103-80A/2103-90A) as sold by Dow Chemical Company and having a tensile modulus of 855 psi at 30 percent elongation; Santoprene 201-87 as sold by Elf Atochem and having tensile modulus of 920 psi at 30 percent elongation; Estane 58223 as sold by The BF Goodrich Company and having a tensile modulus of 1000 psi at 30 percent elongation; Estane 58223 as sold by The BF Goodrich Company and having a tensile modulus of 1000 psi at 30 percent elongation.

The flexing characteristics of the boot may be modified by changing the thickness of the sidewall at various locations along the corrugation. Different materials will require some modifications to effect a most desirable result.

Referring more particularly to FIGS. 2 and 3, an exemplary sidewall is shown and described that is suitable for elastomers such as listed above having a tensile modulus from about 270 psi to about 1000 psi at 30 percent elongation for a four inch diameter constant velocity universal joint that is required to flex at least 40 degrees without any substantial contact with the boot. The tips of the arrows in FIG. 2 are oriented normal to the boot surface and reference the point from which the dimensions listed in the table of FIG. 3 are given. For example, point "a" is located along the X axis at 0.895 inches and has a radius of 2.107 inches along the y axis. The thickness at point "a" is 0.081 inches as measured from the point and direction of the arrowhead "a." As illustrated by the table, the thicknesses of the peaks and valleys of the corrugated sidewall are optionally but preferably thicker than the interconnecting tubular wall portion. It is believed that by having peaks and valleys thicker than the wall section, it minimizes any bending stresses at such points while also controlling the manner in which the boot deflects which will later be explained. The radially outermost, generally tubular wall portion 20 preferably tapers in a direction that increases from the large diameter end of the boot 14 toward the smaller diameter end of the boot 16. As exemplified by the table of FIG. 3, the wall portion 20 or shell increases from a thickness at point d of 0.080 inches to a thickness of 0.096 inches at point e. It is believed that tapering controls the manner in which the wall 20 bulges radially outwardly on the acute angle side of the boot when the large diameter end and small diameter end are angularly misaligned relative to each other.

Figure 5:
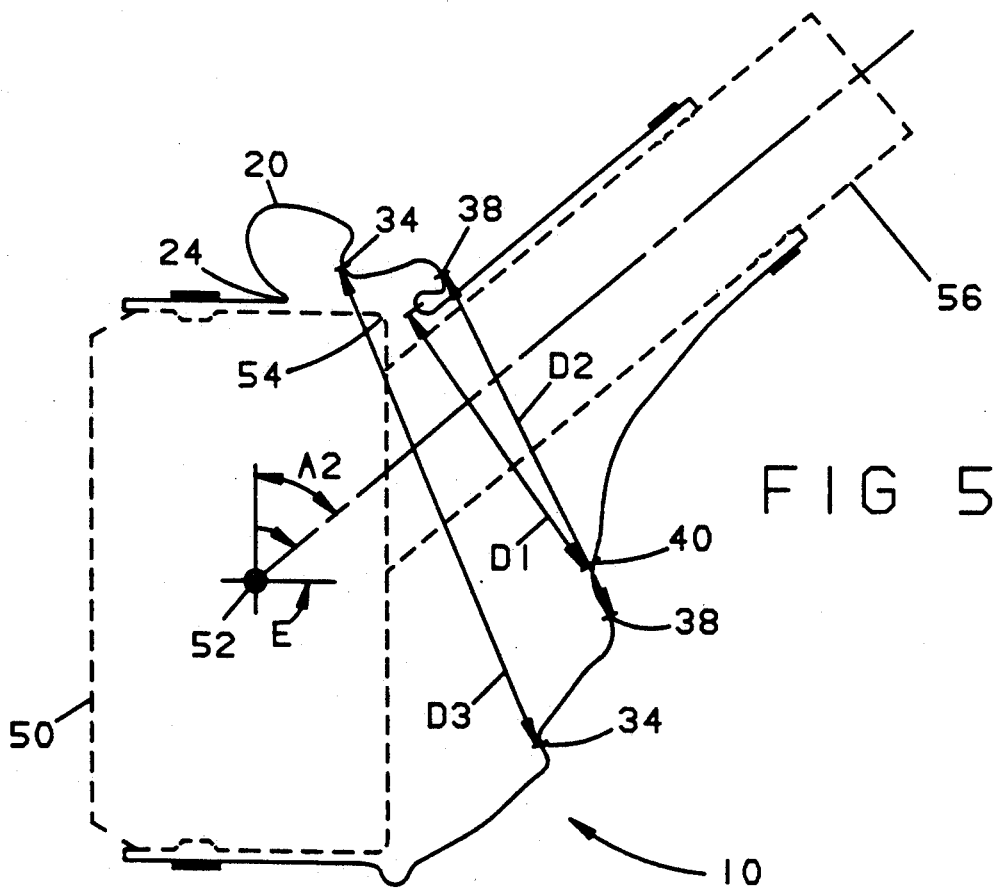
FIG. 5 is a view similar to FIG. 4 but showing the flexible boot deflected with a universal joint to an angle of 40 degrees.

In use, the boot 10 is used with a universal joint 50 such as of the constant velocity type as illustrated in dotted outline in the schematics of FIG. 4 and 5. The boots of FIGS. 4 and 5 are of the same construction as those of FIGS. 1-3 and were made of a thermoplastic urethane material sold under the trade name Estane 58124 and manufactured by The BF Goodrich Company where the material exhibited a tensile modulus of 710 psi at 30 percent elongation.

Referring to FIG. 4, the boot of the invention is installed on a universal joint 50 having a center of movement 52. The universal joint is deflected to an angle C of 20 degrees which is toward the acute angle side A1 of the deflected boot. The outermost tubular wall portion 20 is bulged radially outwardly and away from the circumferential edge 54 of the joint 50. Such movement away from the joint is opposite that of prior art flexible boots. The oppositely facing valleys 24, 34 in cooperation with the oppositely facing peaks 22, 32 act to bulge the wall portion or shell 20.

In the preferred embodiment where the peaks and valleys have a thickness that is greater than an adjoining wall section, they tend to act as annular stiffening rings that control the manner of boot flexing. Valley 40 with its thickened sidewall section operates to generally define an annular ring member of the boot having diameter D1; peak 38 with its thickened sidewall section operates to generally define an annular ring member having a diameter D2; and valley 34 with its thickened sidewall operates to generally define an annular ring member having a diameter D3. The generally defined annular rings operate to stabilize the flexing process and remain somewhat telescopically positioned in relation to each other. On the acute angle A1 side of the boot, loads are transversely applied to the boot by a shaft 56 as it is angularly moved with regard to its center of movement 52. Such movement and the acute angle direction imparts a transverse loading in the boot from valley 40 at diameter D1, to peak 38 at diameter D2, and then to valley 34 at diameter D3 whereby the valley 34 is lifted somewhat away from the circumferential edge 54.

Referring to FIG. 5, the shaft 56 is deflected to an angle E of 40 degrees whereupon the radially outer most tubular wall section 20 or shell is deflected further away from the joint 50 in a direction toward the acute angle E side of the boot A2. The boot flexing process is substantially the same as described for FIG. 4 and wherein the diameters D1, D2 and D3 although changed are substantially similar. The boot flexing process is such that the sidewall is actually moved away from the circumferential edge 54 of the joint during the bending process.

The foregoing detailed description is made for purpose of illustration only and is not intended to limit the scope of the invention which is to be determined from the appended claims.

What is claimed is:

1. In a flexible boot of the polymeric type for use with a universal joint and having a corrugated sidewall oriented generally axially in relation to the boot intermediate a large diameter end and a small diameter end that position in angular misalignment relative to each other as the boot is flexed, the improvement comprising:
   a radially outermost, first generally tubular wall portion having 1) an end portion interconnecting a first external peak, a first valley and a generally tubular portion of the large diameter end and 2) an opposite end portion interconnecting a second external peak, a second valley and a second radially inward, generally tubular portion extending toward the small diameter end, and
   wherein the first peak and first valley are oppositely axially facing in relation to the second peak and second valley and the tubular wall portion is axially spaced from the small diameter end.

2. The flexible boot of claim 1 wherein the first generally tubular wall portion has a curved, convex shape when viewed in axial cross section.

3. The flexible boot of claim 1 wherein the first generally tubular wall portion has a wall thickness that increases from the first peak toward the second peak.

4. The flexible boot of claim 1 which further comprises:
   a radially inward third peak and third valley interconnecting the second radially inward tubular portion and the third valley extending into a third generally tubular wall portion interconnecting the small diameter end and wherein the third peak and third valley are oriented in the same direction as the second peak and second valley.

5. The flexible boot of claim 1 wherein each tubular portion, each valley and each peak have a wall thickness and wherein each peak and each valley have a thickness that is greater than the thickness of its respective interconnecting generally tubular wall portion.

6. The flexible boot of claim 1 wherein the polymeric material has a tensile modulus from about 270 psi to about 1000 psi at thirty percent elongation.

7. The flexible boot of claim 7 wherein the polymeric material is thermoplastic polyurethane having a tensile modulus from about 600 psi to about 900 psi at thirty percent elongation.

8. In a flexible boot of the polymeric type for use with a universal joint and having a corrugated sidewall with a plurality of generally axially oriented and interconnected peaks, valley, and generally tubular walls intermediate a large diameter end and a small diameter end that position in angular misalignment relative to each other as the boot is flexed, the improvement comprising:
   each tubular portion, each peak and each valley have a wall thickness wherein the thickness of at least one peak and the thickness of at least one valley is greater than the wall thickness of its respective
   interconnecting, generally tubular wall portion, a radially outermost, first generally tubular wall portion having
   1) an end portion interconnecting a first external peak, a first valley and a generally tubular portion of the large diameter end and 2) an opposite end portion interconnecting a second external peak, a second valley and a second radially inward, generally tubular portion, extending toward the small diameter end, and
   wherein the first peak and first valley are oppositely axially facing in relation to the second peak and second valley.

9. The flexible boot of claim 8 wherein the second valley is substantially coaxial with the first valley and at a smaller radius.

10. The flexible boot of claim 8 wherein the first generally tubular wall portion has a curved, convex shape when viewed in axial cross section.

11. The flexible boot of claim 10 wherein the first generally tubular wall portion has a wall thickness that increases from the first peak toward the second peak.

12. The flexible boot of claim 8 which further comprises:
   a radially inward third peak and third valley interconnecting the second radially inward tubular portion and the third valley extending into a third generally tubular wall portion interconnecting the small diameter end and wherein third peak and third valley are oriented in the same direction as the second peak and second valley.

13. The flexible boot of claim 8 wherein each tubular portion, each valley and each peak have a wall thickness and wherein each peak and each valley have a thickness that is greater than the thickness of its respective interconnecting generally tubular wall portion.

14. The flexible boot of claim 8 wherein the polymeric material has a tensile modulus from about 270 psi to about 1,000 psi at thirty percent elongation.

15. The flexible boot of claim 14 wherein the polymeric material is thermoplastic polyurethane having a tensile modulus from about 600 psi to about 900 psi at thirty percent elongation.

16. In a flexible boot of the polymeric types for use with a universal joint and having a corrugated sidewall with a plurality of generally axially oriented and interconnecting peaks, valleys, and generally tubular walls intermediate a large diameter end and a small diameter end that position in angular misalignment as the boot is flexed, the improvement comprising:
   a radially outermost, first generally tubular wall portion having 1) an end portion interconnecting a first external peak; a first valley and a generally tubular portion of the large diameter end and 2) an opposite end portion interconnecting a second external peak, a second valley and a second radially inward, generally tubular portion, extending toward the small diameter end, and wherein the first peak and first valley are oppositely axially facing in relation to the second peak and second valley and the tubular wall portion is axially spaced from the small diameter end, the first generally tubular wall portion has a curved, convex shape when viewed in axial cross section, and each tubular portion, each peak and each valley have a wall thickness wherein the thickness of each peak and the thickness of each valley is greater than the wall thickness of its respective interconnecting, generally tubular wall portion.

17. The flexible boot of claim 16 which further comprises:

a radially inward third peak and third valley interconnecting the second radially inward tubular portion and the third valley extending into a third generally tubular wall portion interconnecting the small diameter end and wherein the third peak and third valley are oriented in the same direction as the second peak and valley.

18. The flexible boot of claim 16 wherein the polymeric material has a tensile modulus from about 270 psi to about 1,000 psi at thirty percent elongation.

19. The flexible boot of claim 18 wherein the polymeric material is polyurethane and has a tensile modulus of about 710 psi at thirty percent elongation.

* * * * *